United States Patent
Li et al.

(10) Patent No.: US 9,497,750 B2
(45) Date of Patent: Nov. 15, 2016

(54) METHOD AND APPARATUS FOR TRANSMITTING CONTROL SIGNALING

(71) Applicant: Huawei Technologies Co., Ltd., Shenzhen, Guangdong (CN)

(72) Inventors: Chaojun Li, Beijing (CN); Yongxia Lv, Beijing (CN); Qiang Wu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 14/134,932

(22) Filed: Dec. 19, 2013

(65) Prior Publication Data

US 2014/0105162 A1    Apr. 17, 2014

Related U.S. Application Data

(63) Continuation of application No. PCT/CN2012/077482, filed on Jun. 25, 2012.

(30) Foreign Application Priority Data

Jun. 22, 2011    (CN) .......................... 2011 1 0169679

(51) Int. Cl.
*H04B 7/00* (2006.01)
*H04W 72/04* (2009.01)
(Continued)

(52) U.S. Cl.
CPC ......... *H04W 72/042* (2013.01); *H04B 7/0417* (2013.01); *H04L 5/0091* (2013.01)

(58) Field of Classification Search
CPC    H04W 76/02; H04W 76/025; H04W 76/027
USPC .............. 370/310, 328, 329, 431, 464, 465
See application file for complete search history.

(56) References Cited

U.S. PATENT DOCUMENTS 8,270,359 B2 *    9/2012    Nangia ................ H04B 7/0452
                                                        370/329
9,253,784 B2 *    2/2016    Liu ........................ H04L 5/0053
(Continued)

FOREIGN PATENT DOCUMENTS

CN    101651996 A    2/2010
CN    101714892 A    5/2010
(Continued)

OTHER PUBLICATIONS

"3GPP TS 36.211—3$^{rd}$ Generation Partnership Project; Technical Specification Group Radio Access Network; Evolved Universal Terrestrial Radio Access (E-UTRA); Physical Channels and Modulation (Release 10)," Version 10.1.0, 3$^{rd}$ Generation Partnership Project, Valbonne, France (Mar. 2011).
(Continued)

Primary Examiner — Dmitry H Levitan
(74) Attorney, Agent, or Firm — Leydig, Voit & Mayer, Ltd.

(57) ABSTRACT

The present invention discloses a method and an apparatus for transmitting control signaling. The method includes: determining that a physical downlink shared channel PDSCH transmission scheme for a non-backward compatible component carrier is a user equipment-specific reference signal UE RS-based non-precoding matrix indicator Non-PMI feedback transmission scheme or a UE RS-based up to 8 layer transmission scheme; and sending downlink control information DCI to a UE, where the DCI is used to indicate the determined PDSCH transmission scheme. The apparatus includes a determining module and a first sending module. The method and apparatus in embodiments of the present invention can expand application scenarios of the non-backward compatible component carrier, increase spectrum utilization of the system, and avoid a system capacity decrease problem caused by limitations on the application scenarios of the non-backward compatible component carrier.

18 Claims, 12 Drawing Sheets

(51) Int. Cl.
*H04B 7/04* (2006.01)
*H04L 5/00* (2006.01)

(56) References Cited

U.S. PATENT DOCUMENTS

| | | | | |
|---|---|---|---|---|
| 9,288,691 | B2* | 3/2016 | Park | H04W 24/02 |
| 2010/0098012 | A1* | 4/2010 | Bala | H04L 5/001 |
| | | | | 370/329 |
| 2011/0038310 | A1 | 2/2011 | Chmiel et al. | |
| 2011/0103247 | A1* | 5/2011 | Chen | H04B 7/0452 |
| | | | | 370/252 |
| 2011/0141941 | A1* | 6/2011 | Lee | H04L 1/0038 |
| | | | | 370/252 |
| 2012/0134275 | A1* | 5/2012 | Choi | H04L 5/0057 |
| | | | | 370/241 |
| 2012/0207103 | A1 | 8/2012 | Dai et al. | |
| 2013/0039297 | A1* | 2/2013 | Wang | 370/329 |
| 2013/0088980 | A1* | 4/2013 | Kim et al. | 370/252 |
| 2013/0250879 | A1* | 9/2013 | Ng et al. | 370/329 |
| 2014/0016714 | A1* | 1/2014 | Chen et al. | 375/260 |
| 2014/0185578 | A1* | 7/2014 | Park et al. | 370/329 |
| 2014/0247775 | A1* | 9/2014 | Frenne et al. | 370/329 |

FOREIGN PATENT DOCUMENTS

| | | |
|---|---|---|
| CN | 101789823 A | 7/2010 |
| CN | 102076098 A | 5/2011 |

OTHER PUBLICATIONS

"DL Control Signaling for Dual-layer BF in LTE Rel-9," 3GPP TSG RAN WG1 Meeting #58bis, Miyazaki, Japan, R1-093505, $3^{rd}$ Generation Partnership Project, Valbonne, France (Oct. 12-16, 2009).

"ETSI TS 136.212—LTE; Evolved Universal Terrestrial Radio Access (E-UTRA); Multiplexing and channel coding (3GPP TS 36.212 version 10.2.0 Release 10)," European Telecommunications Standards Institute, Valbonne, France (Jun. 2011).

Ghosh et al., "LTE-Advanced: Next-Generation Wireless Broadband Technology," Invited Paper, IEEE Wireless Communications, IEEE, New York, New York (Jun. 2010).

"3GPP TS 36.213—$3^{rd}$ Generation Partnership Project; Technical Specification Group Radio Access Network; Evolved Universal Terrestrial Radio Access (E-UTRA); Physical layer procedures (Release 10)," Version 10.1.0, $3^{rd}$ Generation Partnership Project, Valbonne, France (Mar. 2011).

"$3^{rd}$ Generation Partnership Project; Technical Specification Group Radio Access Network; Evolved Universal Terrestrial Radio Access (E-UTRA); Physical layer procedures (Release 11)," 3GPP TS 36.213, V11.4.0, pp. 1-182, $3^{rd}$ Generation Partnership Project, Valbonne, France (Sep. 2013).

"SFBC PDSCH transmission in CSI-RS subframes," 3GPP TSG-RAN WG1 #63bis, Dublin, Ireland, R1-110333, $3^{rd}$ Generation Partnership Project, Valbonne, France (Jan. 17-21, 2011).

\* cited by examiner

100

| Determine that a PDSCH transmission scheme for a non-backward compatible component carrier is a UE RS-based Non-PMI feedback transmission scheme or a UE RS-based up to 8 layer transmission scheme | S110 |

↓

| Send downlink control information DCI to a user equipment, where the DCI is used to indicate the determined PDSCH transmission scheme | S120 |

| Determine that a PDSCH transmission scheme for a non-backward compatible component carrier is a UE RS-based Non-PMI feedback transmission scheme or a UE RS-based up to 8 layer transmission scheme | S110 |

↓

| Send downlink control information DCI to a user equipment, where the DCI is used to indicate the determined PDSCH transmission scheme | S120 |

↓

| Send a PDSCH and a UE RS corresponding to the PDSCH transmission scheme to the user equipment | S130 |

FIG. 1B

CRS    UE RS

200

Acquire a UE RS corresponding to the PDSCH transmission scheme, where the UE RS is a signal that is intercepted from a CRS and belongs to a same frequency domain range as the UE RS — S210

Send the PDSCH and the UE RS corresponding to the PDSCH transmission scheme to the user equipment — S220

300

300

METHOD AND APPARATUS FOR TRANSMITTING CONTROL SIGNALING

CROSS-REFERENCE TO RELATED APPLICATIONS

This application is a continuation of International Patent Application No. PCT/CN2012/077482, filed on Jun. 25, 2012, which claims priority to Chinese Patent Application No. 201110169679.3, filed on Jun. 22, 2011, both of which are hereby incorporated by reference in their entireties.

TECHNICAL FIELD

The present invention relates to the field of communications, and in particular, to a method and an apparatus for transmitting control signaling.

BACKGROUND

In a Long Term Evolution (Long Term Evolution, "LTE" for short) system or a Long Term Evolution Advanced (Long Term Evolution Advanced, "LTE-A" for short) system, before a user equipment (User Equipment, "UE" for short) receives or sends service data, the UE needs to learn downlink control information (Downlink Control Information, "DCI" for short) configured by a Evolved NodeB (Evolved NodeB, "eNB" for short) for the UE. The DCI is carried by a physical downlink control channel (Physical Downlink Control Channel, "PDCCH" for short), and different DCI formats (DCI formats) may be used to indicate different transmission modes (Transmission Modes).

The LTE-A system has introduced a carrier aggregation (Carrier Aggregation, "CA" for short) technology, that is, the LTE-A system can concurrently receive or transmit a plurality of component carriers (Component Carriers, "CCs" for short). In the LTE-A system, DCI configured for each component carrier is independently encoded, that is, DCI configured for different component carriers is carried in different PDCCHs. In LTE-A release 10 (Release 10, "Rel-10" for short), each component carrier is backward compatible, that is, each component carrier can be accessed by UEs complying with LTE release 8/9 (Release 8/9, "Rel-8/9" for short), where such UEs are referred to as LTE Rel-8 UEs or LTE Rel-9 UEs. However, in LTE-A release 11 (Release 11, "Rel-11" for short) under discussion, one or more component carriers may be configured to be non-backward compatible. The non-backward compatible component carrier cannot be accessed by a UE complying with LTE release 8/9 and/or release 10.

To increase spectrum utilization, a cell-specific reference signal (Cell-specific Reference Signal, "CRS" for short) does not need to be configured on such non-backward compatible component carriers, that is, transmission of the CRS is not supported. The CRS does not need to be measured only in downlink transmission mode 9 of related downlink transmission modes. The CRS needs to be measured in other downlink transmission modes. Therefore, the non-backward compatible component carriers can support only downlink transmission mode 9.

However, downlink transmission mode 9 is not applicable to small-sized traffic (Small-Sized Traffic) and high-speed movement scenarios, that is, application scenarios of the non-backward compatible component carriers are limited, and therefore spectrum utilization is reduced. In addition, when a lot of non-backward compatible component carriers are configured, the system capacity may be decreased due to limitations on the application scenarios of the non-backward compatible component carriers.

SUMMARY

Therefore, embodiments of the present invention provide a method and an apparatus for transmitting control signaling, which can expand application scenarios of a non-backward compatible component carrier and increase spectrum utilization of the system.

In one aspect, an embodiment of the present invention provides a method for transmitting control signaling, where the method includes: determining that a physical downlink shared channel PDSCH transmission scheme for a non-backward compatible component carrier is a user equipment-specific reference signal UE RS-based non precoding matrix indicator Non-PMI feedback transmission scheme or a UE RS-based up to 8 layer transmission scheme; and sending downlink control information DCI to a UE, where the DCI is used to indicate the determined PDSCH transmission scheme.

In another aspect, an embodiment of the present invention provides a method for transmitting control signaling, where the method includes: receiving downlink control information DCI sent by a eNB; and determining, according to the DCI, that a physical downlink shared channel PDSCH transmission scheme for a non-backward compatible component carrier is a user equipment-specific reference signal UE RS-based non precoding matrix indicator Non-PMI feedback transmission scheme or a UE RS-based up to 8 layer transmission scheme.

In another aspect, an embodiment of the present invention provides an apparatus for transmitting control signaling, where the apparatus includes: a determining module, configured to determine that a physical downlink shared channel PDSCH transmission scheme for a non-backward compatible component carrier is a user equipment-specific reference signal UE RS-based non precoding matrix indicator Non-PMI feedback transmission scheme or a UE RS-based up to 8 layer transmission scheme; and a first sending module, configured to send downlink control information DCI to a UE, where the DCI is used to indicate the PDSCH transmission scheme determined by the determining module.

In another aspect, an embodiment of the present invention provides an apparatus for transmitting control signaling, where the apparatus includes: a first receiving module, configured to receive downlink control information DCI sent by a eNB; and a determining module, configured to determine, according to the DCI received by the first receiving module, that a physical downlink shared channel PDSCH transmission scheme for a non-backward compatible component carrier is a user equipment-specific reference signal UE RS-based non precoding matrix indicator Non-PMI feedback transmission scheme or a UE RS-based up to 8 layer transmission scheme.

Based on the foregoing technical solutions, the method and apparatus in embodiments of the present invention, by determining that a PDSCH transmission scheme for a non-backward compatible component carrier is a UE RS-based Non-PMI feedback transmission scheme or a UE RS-based up to 8 layer transmission scheme and notifying the scheme to a UE, can expand application scenarios of the non-backward compatible component carrier, increase spectrum utilization of the system, and avoid a system capacity decrease problem caused by limitations on the application scenarios of the non-backward compatible component carrier.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1A and FIG. 1B are schematic flowcharts of a method for transmitting control signaling according to an embodiment of the present invention;

DESCRIPTION OF EMBODIMENTS

Figures 2A, 2B:
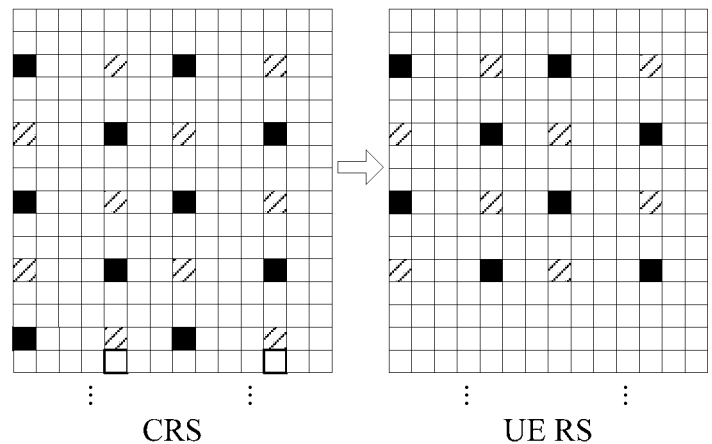
FIG. 2A and FIG. 2B are schematic flowcharts of a method for acquiring a user equipment-specific reference signal according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For the convenience of description, embodiments of the present invention use LTE-A system as an example. It should be understood that in the embodiments of the present invention, the LTE-A system is exemplarily an application scenario, but the embodiments of the present invention are not limited to this application scenario, for example, a method and an apparatus according to the embodiments of the present invention may also be applied in later releases of the LTE-A system.

In the embodiments of the present invention, different transmission modes may correspond to different DCI formats. Table 1 shows DCI formats scrambled with a cell radio network temporary identifier (Cell Radio Network Temporary Identifier, "C-RNTI" for short) and corresponding to different downlink transmission modes in related technologies, and corresponding physical downlink shared channel (Physical Downlink Shared Channel, "PDSCH" for short) transmission schemes.

TABLE 1

| Downlink transmission mode | DCI format | PDSCH transmission scheme |
| --- | --- | --- |
| Mode 1 | DCI format 1A | Single-Antenna Port, port 0 |
|  | DCI format 1 | Single-antenna Port, port 0 |
| Mode 2 | DCI format 1A | Transmit diversity scheme (Transmit Diversity, "TxD" for short) |
|  | DCI format 1 | Transmit diversity |
| Mode 3 | DCI format 1A | Transmit diversity |
|  | DCI format 2A | Large delay cyclic delay diversity (Cyclic Delay Diversity, "CDD" for short) or transmit diversity |
| Mode 4 | DCI format 1A | Transmit diversity |
|  | DCI format 2 | Closed-loop spatial multiplexing (Closed-Loop Spatial Multiplexing, "CL SM" for short) or transmit diversity |
| Mode 5 | DCI format 1A | Transmit diversity |
|  | DCI format 1D | Multi-user multiple-input multiple-output (Multi-user MIMO, "MU-MIMO" for short) |
| Mode 6 | DCI format 1A | Transmit diversity |
|  | DCI format 1B | Precoding with a closed-loop rank of 1 (Closed-loop spatial multiplexing using a single transmission layer) |
| Mode 7 | DCI format 1A | If the number of antenna ports on a physical broadcast channel (Physical Broadcast Channel, "PBCH" for short) is 1, single-antenna Port, port 0; otherwise, transmit diversity scheme |
|  | DCI format 1 | Single-antenna Port, port 5 |
| Mode 8 | DCI format 1A | If the number of antenna ports on a PBCH is 1, single-antenna Port, port 0; otherwise, transmit diversity |
|  | DCI format 2B | Dual-layer transmission, port 7 and port 8, or, single-antenna Port, port 7 or port 8 |
| Mode 9 | DCI format 1A | Non multicast broadcast single frequency network (Multicast Broadcast Single Frequency Network, "MBSFN" for short) subframe: If the number of antenna ports on a PBCH is 1, single-antenna Port, port 0; otherwise, transmit diversity; MBSFN subframe: Single-antenna Port, port 7 |
|  | DCI format 2C | Up to 8 layer transmission scheme (UP to 8 Layer Transmission), ports 7-14 (a reference signal sent using ports 7-14 may be a UE RS) |

In Table 1, the port number in a PDSCH transmission scheme corresponding to each transmission mode may refer to a port number used by a reference signal in the transmission scheme. Different port numbers and combinations thereof may correspond to different types of reference signals.

The following describes, with reference to FIG. 1A to FIG. 4, a method for transmitting control signaling according to the embodiments of the present invention.

FIG. 1A illustrates a schematic flowchart of a method 100 for transmitting control signaling according to an embodiment of the present invention. As shown in FIG. 1A, the method 100 includes the following:

S110: Determine that a PDSCH transmission scheme for a non-backward compatible component carrier is a user equipment-specific reference signal (User equipment-specific Reference Signal, "UE RS" for short) based non precoding matrix indicator (Non-Precoding Matrix Indicator, "Non-PMI" for short) feedback transmission scheme or a UE RS-based up to 8 layer transmission scheme, where the Non-PMI means that no PMI is fed back in a corresponding transmission scheme, that is, the UE RS-based Non-PMI feedback transmission scheme is a transmission scheme where no PMI is fed back by a UE.

S120: Send DCI to a UE, where the DCI is used to indicate the determined PDSCH transmission scheme.

To expand application scenarios of the non-backward compatible component carrier and increase spectrum utilization of the system, a eNB can determine that the PDSCH transmission scheme for the non-backward compatible component carrier is a UE RS-based Non-PMI feedback transmission scheme or a UE RS-based up to 8 layer transmission scheme, and the eNB can notify, by sending DCI to the UE, the UE of the PDSCH transmission scheme determined by the eNB for the non-backward compatible component carrier.

Therefore, the method in the embodiment of the present invention, by determining that a PDSCH transmission scheme of a non-backward compatible component carrier is a UE RS-based Non-PMI feedback transmission scheme or a UE RS-based up to 8 layer transmission scheme and notifying the scheme to a UE, can expand application scenarios of the non-backward compatible component carrier, increase spectrum utilization of the system, and avoid a system capacity decrease problem caused by limitations on the application scenarios of the non-backward compatible component carrier.

In the embodiment of the present invention, after determining a PDSCH transmission scheme for the non-backward compatible component carrier, the eNB may further send, according to the determined PDSCH transmission scheme, a PDSCH and UE RS corresponding to the PDSCH transmission scheme to the UE, as shown in S130 in FIG. 1B.

It should be understood that the sequence numbers of the foregoing processes do not represent priorities of the execution sequences, and that the execution sequence of each process should be determined according to functions and internal logics, and should not constitute any limitation on the implementation process of the embodiment of the present invention. For example, S120 and S130 may be performed concurrently, that is, the eNB sends the DCI, the PDSCH, and the UE RS in the same subframe. S120 may also be performed before S130, that is, the eNB may send the PDSCH and the UE RS after an interval of one or more subframes after sending the DCI.

In the embodiment of the present invention, a backward compatible component carrier refers to a component carrier that can be accessed by UEs of LTE Rel-8, LTE Rel-9, and LTE Rel-10, and a non-backward compatible component carrier refers to a component carrier that cannot be accessed by UEs of LTE Rel-8, LTE Rel-9, and LTE Rel-10, where the non-backward compatible component carrier is not configured with a CRS, or the non-backward compatible component carrier refers to a component carrier that cannot be accessed by UEs of LTE Rel-8 and LTE Rel-9 but can be accessed by a UE of LTE Rel-10, for example, an MBSFN subframe is configured on the non-backward compatible component carrier but no CRS is configured in a data region (that is, a region where the PDSCH is transmitted).

In the embodiment of the present invention, a UE-specific reference signal (UE RS) may also be called a dedicated reference signal (Dedicated Reference Signal), where the UE RS is a reference signal specially sent by the eNB to a specific UE rather than all UEs. The UE RS-based transmission scheme may refer to a transmission scheme where the UE RS is used as a demodulation reference signal of a data channel (for example, the PDSCH).

In the embodiment of the present invention, the UE RS-based Non-PMI feedback transmission scheme may be a UE RS-based open-loop MIMO (UE RS based Open Loop MIMO) transmission scheme, that is, the non-backward compatible component carrier may support a UE RS-based open-loop MIMO transmission scheme or a UE RS-based up to 8 layer transmission scheme. It should be understood that the UE RS-based open-loop MIMO transmission scheme refers to a multi-antenna transmission scheme where a PMI does not need to be fed back, or a multi-antenna transmission scheme where a PMI and a rank indicator (Rank Indicator, "RI" for short) does not need to be fed back, for example, the open-loop MIMO may be transmit diversity scheme (Transmit Diversity Scheme), open-loop beamforming (Open-Loop Beamforming), or open-loop spatial multiplexing (OL SM, Open-Loop Spatial Multiplexing), and the like.

In the embodiment of the present invention, the UE RS-based Non-PMI feedback transmission scheme may also be a UE RS-based single-antenna port transmission scheme, that is, the non-backward compatible component carrier may support the UE RS-based open-loop MIMO transmission scheme, the UE RS-based single-antenna port transmission scheme, or the UE RS-based up to 8 layer transmission scheme. Therefore, in the embodiment of the present invention, the PDSCH transmission scheme determined by the eNB is the UE RS-based open-loop MIMO transmission scheme, the UE RS-based single-antenna port transmission scheme, or the UE RS-based up to 8 layer transmission scheme. It should be noted that when the UE RS-based Non-PMI feedback transmission scheme does not include the UE RS-based single-antenna port transmission scheme (but includes only the UE RS-based open-loop MIMO transmission scheme), the PDSCH transmission scheme determined by the eNB is the UE RS-based open-loop MIMO transmission scheme or the UE RS-based up to 8 layer transmission scheme.

In step S110, the eNB may determine, according to various actual application scenarios or various parameters, a PDSCH transmission scheme for a current non-backward compatible component carrier. Alternatively, the eNB may determine, according to the current channel conditions and service status, a PDSCH transmission scheme for a current non-backward compatible component carrier. For example, for small-sized traffic and high-speed movement scenarios, the PDSCH transmission scheme determined by the eNB may be the UE RS-based open-loop MIMO transmission scheme. Alternatively, the eNB may also determine, according to measurement precision of current channel state information (Channel State Information, "CSI" for short), a PDSCH transmission scheme for a current non-backward compatible component carrier. For example, when the measurement precision of the CSI is low, the PDSCH transmission scheme determined by the eNB may be the UE RS-based open-loop MIMO transmission scheme.

It should be noted that when the eNB and the UE support a plurality of transmission modes (for example, transmission modes 1 to 9), to specify a current transmission mode, the eNB may notify the UE by sending Radio Resource Control (RRC) signaling. Correspondingly, if there is only one transmission mode (which may be defined as transmission mode 9, transmission mode 10, or another transmission mode) for the non-backward compatible carrier, the eNB does not need to notify the UE of a current transmission mode by sending RRC signaling; if there are a plurality of transmission modes for the non-backward compatible carrier, the eNB may notify the UE of a current transmission mode by sending RRC signaling. In examples of subsequent embodiments, it is assumed that the transmission mode is defined as transmission mode 9, but the transmission mode is not limited thereto and may also be defined as another transmission mode.

In step S120, the eNB sends DCI to the UE according to the determined PDSCH transmission scheme, where the DCI is used to indicate the PDSCH transmission scheme determined by the eNB. In the embodiment of the present invention, the eNB may indicate the PDSCH transmission scheme by using a plurality of DCI formats.

Specifically, the eNB may indicate, by using a DCI format 1A, that the PDSCH transmission scheme for the non-backward compatible component carrier is a UE RS-based Non-PMI feedback transmission scheme; the eNB may also indicate, by using a DCI format 1, that the PDSCH transmission scheme for the non-backward compatible component carrier is a UE RS-based Non-PMI feedback transmission scheme; the eNB may further indicate, by using a DCI format 2C, that the PDSCH transmission scheme for the non-backward compatible component carrier is a UE RS-based up to 8 layer transmission scheme. Alternatively, the DCI format 2C may indicate the UE RS-based Non-PMI feedback transmission scheme. In this case, whether the current DCI format 2C indicates the UE RS-based up to 8 layer transmission scheme or the UE RS-based Non-PMI feedback transmission scheme needs to be differentiated.

In the embodiment of the present invention, after determining whether the PDSCH transmission scheme is a UE RS-based up to 8 layer transmission scheme or a UE RS-based Non-PMI feedback transmission scheme, the eNB may correspondingly determine values of three bits used to indicate antenna ports (Antenna Ports), a scrambling identity (Scrambling identity), and the number of layers indication (Number of Layers Indication) in the DCI in the DCI format 2C, and the number of transport blocks (Transport Blocks, "TBs" for short) indicated by the DCI.

For example, when the values of three bits used to indicate the antenna ports, the scrambling identity, and the number of layers indication in the DCI in the DCI format 2C are "111" (the decimal value is 7) and the DCI indicates only one transport block, the eNB indicates, by using the DCI format 2C, that the PDSCH transmission scheme for the non-backward compatible component carrier is the UE RS-based Non-PMI feedback transmission scheme (for example, specifically the UE RS-based open-loop MIMO transmission scheme); otherwise, the PDSCH transmission scheme determined by the eNB is the UE RS-based up to 8 layer transmission scheme. In the scheme described in this embodiment, new bits do not need to be added to differentiate the UE RS-based up to 8 layer transmission scheme from the UE RS-based open-loop MIMO transmission scheme. It should be understood that the DCI format 2C may indicate transmission of two transport blocks; when a modulation and coding scheme (Modulation and Coding Scheme, "MCS" for short) field of one transport block is "00000" (that is, $I_{MCS}=0$) and a redundancy version (Redundancy Version, "RV" for short) field of the one transport block is "1" (that is, rvidx=1), the transport block is not transmitted, that is, the transport block is disabled (Disabled). Therefore, when any one transport block is disabled, it always means that the DCI indicates only one transport block. It should be noted that because the number of transport blocks is the same as the number of codewords (Codewords), when there is only one transport block, only one codeword appears; when the values of three bits used to indicate the antenna ports, the scrambling identity, and the number of layers indication in the DCI in the DCI format 2C are "111" and the DCI indicates only one codeword (equivalent to the fact that the DCI indicates only one transport block), the DCI may also be used to indicate that the PDSCH transmission scheme for the non-backward compatible component carrier is the UE RS-based Non-PMI feedback transmission scheme.

Therefore, in the embodiment of the present invention, the sending, by the eNB, DCI to the UE may include: sending, by the eNB, the DCI in a DCI format 1A or a DCI format 1 to the UE when the PDSCH transmission scheme is the UE RS-based Non-PMI feedback transmission scheme; or sending, by the eNB, the DCI in a DCI format 2C to the UE when the PDSCH transmission scheme is the UE RS-based Non-PMI feedback transmission scheme, where values of three bits used to indicate the antenna ports, the scrambling identity, and the number of layers indication in the DCI are "111", and the DCI indicates only one transport block.

Specifically, the UE RS-based Non-PMI feedback transmission scheme may include only the UE RS-based open-loop MIMO transmission scheme. In this case, the eNB indicates, by using the DCI format 1A/1/2C, that the PDSCH transmission scheme for the non-backward compatible component carrier is the UE RS-based open-loop MIMO transmission scheme.

Specifically, when the UE RS-based Non-PMI feedback transmission scheme may include the UE RS-based open-loop MIMO transmission scheme or the UE RS-based single-antenna port transmission scheme, the eNB may indicate, by using the DCI format 1A/1/2C, that the PDSCH transmission scheme for the non-backward compatible component carrier is the UE RS-based open-loop MIMO transmission scheme or the UE RS-based single-antenna port transmission scheme. In this case, whether the DCI format 1A/1/2C indicates the UE RS-based open-loop MIMO transmission scheme or the UE RS-based single-antenna port transmission scheme may be differentiated by using the number of antenna ports corresponding to the UE RS.

For example, when there is only one antenna port of the UE RS, it indicates that the currently determined PDSCH transmission scheme is the UE RS-based single-antenna port transmission scheme; otherwise, the PDSCH transmission scheme is the UE RS-based open-loop MIMO transmission scheme.

In the embodiment of the present invention, the DCI format 1 may support discontinuous and continuous resource allocation modes, while the DCI format 1A supports only a continuous resource allocation mode. Therefore, by using the method where the eNB uses the DCI format 1A to indicate the PDSCH transmission scheme for the non-backward compatible component carrier format, overheads can be saved; by using the method where the eNB uses the DCI format 1 to indicate the PDSCH transmission scheme for the non-backward compatible component carrier format, resource allocation is more flexible, and only few overheads are added.

For the method where the eNB uses the DCI format 2C to indicate the PDSCH transmission scheme for the non-backward compatible component carrier format, because the DCI format 1A may not be monitored, the number of blind detections can be reduced and the blind detection efficiency can be improved.

In the embodiment of the present invention, the determining, by the eNB, the PDSCH transmission scheme for the non-backward compatible component carrier not only includes determining that the PDSCH transmission scheme is a UE RS-based Non-PMI feedback transmission scheme or a UE RS-based up to 8 layer transmission scheme, but also includes determining or indicating antenna ports corresponding to the UE RS.

Alternatively, the eNB may determine antenna ports corresponding to the UE RS according to predefined antenna ports or according to the number of antenna ports of a channel state information-reference signal CSI-RS. Correspondingly, the UE may determine the antenna ports corresponding to the UE RS according to the predefined antenna ports stored in the UE, or the UE acquires the number of antenna ports of the CSI-RS from the eNB, and determines the antenna ports corresponding to the UE RS according to the number of antenna ports of the CSI-RS. The determining the antenna ports corresponding to the UE RS according to the predefined antenna ports may be specifically: using the predefined antenna ports as the antenna ports corresponding to the UE RS.

Alternatively, in addition to the foregoing solution for determining the antenna ports corresponding to the UE RS, the eNB may also determine the antenna ports corresponding to the UE RS according to other specific algorithms (for example, an algorithm using channel conditions as inputs). In this case, the eNB may send signaling carried by the DCI or higher layer signaling to the UE, where the signaling carried by the DCI or the higher layer signaling is used to indicate the determined antenna ports corresponding to the UE RS. When the eNB indicates the PDSCH transmission scheme by using the DCI format 2C, the eNB further sends signaling carried in a new data indicator field of a disabled transport block in the DCI to the UE, where the signaling carried in the new data indicator field is used to indicate the determined antenna ports corresponding to the UE RS. The following describes a method for determining or indicating antenna ports of a UE RS.

In the embodiment of the present invention, the eNB may determine the antenna ports corresponding to the UE RS according to the predefined antenna ports. When this scheme is used, preferably, the UE RS-based Non-PMI feedback transmission scheme may include only the UE RS-based open-loop MIMO transmission scheme.

Specifically, in LTE-A Rel-10, antenna ports of a UE RS include port 5 and ports 7-14; if no new antenna ports corresponding to the UE RS are added to later releases, the antenna ports corresponding to the UE RS used in the open-loop MIMO scheme are port 5 and N ports of ports 7-14, where N is an integer greater than 1, for example, the antenna ports corresponding to the UE RS are predefined as port 7 and port 8. When the UE RS-based open-loop MIMO transmission scheme is a UE RS-based transmit diversity scheme, the transmit diversity scheme preferably supports two or four transmit antennas. In this case, for two transmit antennas, the antenna ports corresponding to the UE RS may be predefined as port 7 and port 8; for four transmit antennas, the antenna ports corresponding to the UE RS may be predefined as ports 7-10. Table 2 and Table 3 show a specific example of determining antenna ports of a UE RS in the PDSCH transmission scheme according to predefined antenna ports. In Table 3, a DCI format 2C may not only indicate an up to 8 layer transmission scheme, but also indicate a UE RS-based Non-PMI feedback transmission scheme (for example, a UE RS-based transmit diversity scheme); the UE may further determine, according to values of three bits used to indicate antenna ports, a scrambling identity, and the number of layers indication in the DCI, and whether the DCI indicates only one transport block, that the PDSCH transmission scheme is the up to 8 layer transmission scheme or the UE RS-based Non-PMI feedback transmission scheme.

TABLE 2

| Downlink transmission node | DCI format | PDSCH transmission scheme |
| --- | --- | --- |
| Mode 9 (or defined as another transmission mode, for example, mode 10) | DCI format 1A | Transmit diversity, where antenna ports corresponding to the UE RS are port 7 and port 8 |
| | DCI format 2C | Up to 8 layer transmission, where antenna ports corresponding to the UE RS are ports 7-14 |

TABLE 3

| Downlink transmission mode | DCI format | PDSCH transmission scheme |
| --- | --- | --- |
| Mode 9 (or defined as another transmission mode, for example, mode 10) | DCI format 2C | Transmit diversity, where antenna ports corresponding to the UE RS are port 7 and port 8 |
| | DCI format 2C | Up to 8 layer transmission scheme, where antenna ports corresponding to the UE RS are ports 7-14 |

If new antenna ports corresponding to the UE RS are added to later LTE-A releases (including Rel-11 and later releases), the antenna ports corresponding to the UE RS may also be predefined as the newly added antenna ports corresponding to the UE RS. Table 4 shows a specific example of determining antenna ports corresponding to the UE RS in the PDSCH transmission scheme according to predefined antenna ports when newly designed ports in later LTE-A releases include X and Y.

TABLE 4

| Downlink transmission mode | DCI format | PDSCH transmission scheme |
| --- | --- | --- |
| Mode 9 (or defined as another transmission mode, for example, mode 10) | DCI format 1A | Transmit diversity, where antenna ports corresponding to the UE RS are X and Y |
| | DCI format 2C | Up to 8 layer transmission scheme, where antenna ports corresponding to the UE RS are ports 7-14 |

It should be additionally noted that when the eNB determines the antenna ports corresponding to the UE RS according to the predefined antenna ports, the DCI format 1A, DCI format 1, or the DCI format 2C may not be used to indicate the UE RS-based single-antenna port transmission scheme.

In the embodiment of the present invention, the eNB may determine the antenna ports corresponding to the UE RS according to the number of antenna ports contained in the channel state information-reference signal (Channel State Information-RS, "CSI-RS" for short).

Specifically, because measurement of channel quality Indicator (Channel Quality Indicator, "CQI" for short) is related to the number of antenna ports of the current CSI-RS, to acquire an accurate CQI, the number of used antenna ports of the current UE RS should correspond to the number of antenna ports of the CSI-RS on a one-to-one basis. Specifically, the number of antenna ports corresponding to the UE RS is equal to the number of antenna ports of the CSI-RS, for example, when the number of antenna ports of the CSI-RS is 2, the number of antenna ports corresponding to the UE RS is also 2. Alternatively, antenna port numbers of the UE RS may be selected from learned antenna port numbers or newly designed port numbers at random or according to a predefined rule. Alternatively, the UE side and the eNB side may store the same rule for selecting antenna port numbers of a UE RS, and the UE may determine specific antenna port numbers of the UE RS according to the number of antenna ports of the CSI-RS. In this way, signaling interactions between the eNB and the UE can be reduced.

It should be noted that the specifically determined antenna ports may be antenna ports of a UE RS defined in LTE-A Rel-10 or be antenna ports of a UE RS newly designed in later LTE-A releases. For example, Table 5 shows a specific example of determining antenna ports corresponding to the UE RS in the PDSCH transmission scheme according to the number of antenna ports of the CSI-RS.

TABLE 5

| Downlink transmission mode | DCI format | PDSCH transmission scheme |
|---|---|---|
| Mode 9 (or defined as another transmission mode, for example, mode 10) | DCI format 1A | If the number of antenna ports of the CSI-RS is 1, a single-antenna port transmission scheme where the antenna port of the UE RS is port 7 is used; if the number of antenna ports of the CSI-RS is 2, an open-loop MIMO transmission scheme where the antenna ports corresponding to the UE RS are port 7 and port 8 is used; if the number of antenna ports of the CSI-RS is 4, an open-loop MIMO transmission scheme where the antenna ports corresponding to the UE RS are ports 7-10 is used; and if the number of antenna ports of the CSI-RS is 8, an open-loop MIMO transmission scheme where the antenna ports corresponding to the UE RS are ports 7-14 is used. |
|  | DCI format 2C | Up to 8 layer transmission scheme, ports 7-14 |

When the UE RS-based open-loop MIMO transmission scheme is a UE RS-based transmit diversity scheme, the transmit diversity scheme preferably supports only two or four transmit antennas. In this case, when the number of antenna ports of the CSI-RS is 1, a single-antenna port transmission scheme or a transmit diversity scheme with two transmit antennas is used; when the number of antenna ports of the CSI-RS is 2, transmit diversity scheme with two transmit antennas is used; when the number of antenna ports of the CSI-RS is greater than or equal to 4 (for example, 4 or 8), transmit diversity scheme with four transmit antennas is used.

For example, Table 6 shows another specific example of determining antenna ports corresponding to the UE RS in the PDSCH transmission scheme according to the number of antenna ports of the CSI-RS.

case, when the number of antenna ports of the CSI-RS is 1, a single-antenna port transmission scheme or a transmit diversity scheme with two transmit antennas may be used; when the number of antenna ports of the CSI-RS is 2, 4, or 8, a transmit diversity scheme with two transmit antennas may be used. It should be noted that the specifically determined antenna ports may be antenna ports corresponding to the UE RS defined in LTE-A Rel-10 or be antenna ports corresponding to the UE RS newly designed in LTE-A Rel-11 or later releases.

In the embodiment of the present invention, the eNB may also send signaling carried by the DCI or higher layer signaling to the UE, so that the UE determines antenna ports corresponding to the UE RS, where the signaling carried by the DCI or the higher layer signaling indicates the antenna ports corresponding to the UE RS.

Specifically, when the signaling used to indicate the antenna ports corresponding to the UE RS is higher layer

TABLE 6

| Downlink transmission mode | DCI format | PDSCH transmission scheme |
|---|---|---|
| Mode 9 (or defined as another transmission mode, for example, mode 10) | DCI format 1A | If the number of antenna ports of the CSI-RS is 1, a single-antenna port transmission scheme where the antenna port of the UE RS is port 7 is used; if the number of antenna ports of the CSI-RS is 2, a transmit diversity scheme where the antenna ports corresponding to the UE RS are port 7 and port 8 is used; and if the number of antenna ports of the CSI-RS is 4 or 8, a transmit diversity scheme where the antenna ports corresponding to the UE RS are ports 7-10 is used. |
|  | DCI format 2C | Up to 8 layer transmission scheme, where the antenna ports corresponding to the UE RS are ports 7-14 |

To further simplify the scheme, the transmit diversity scheme may also support only two transmit antennas. In this signaling (Higher Layer Signaling), the higher layer signaling is preferably radio resource control (Radio Resource Control, "RRC" for short) signaling. The higher layer signaling is relative to physical layer signaling, and is signaling sent from a higher layer (Layer) and with a lower transmission frequency, which includes RRC signaling, Media Access Control (Media Access Control, "MAC" for short) signaling, and the like.

When the signaling used to indicate the antenna ports corresponding to the UE RS is signaling carried by the DCI, a bit in the DCI may be used to indicate the number of antenna ports corresponding to the UE RS. For example, when the DCI carrying the signaling is in a DCI format 1A, the bit may be a new bit in the DCI or an existing bit in the DCI may be reused, that is, the existing bit is redefined. For example, at least one bit in a transmit power control (Transmit Power Control, "TPC" for short) command field, a demodulation reference signal (Demodulation Reference Signal, "DMRS" for short) cyclic shift (Cyclic Shift, "CS" for short) field, and a modulation and coding scheme (Modulation and Coding Scheme, "MCS" for short) and redundancy version (Redundancy Version, "RV" for short) field may be selected and redefined.

For example, a most significant bit (Most Significant Bit, "MSB" for short) in the MCS and RV field is selected to indicate the antenna ports corresponding to the UE RS. In this case, the most significant bit in the MCS and RV field may be predefined as "0". When the UE RS-based open-loop MIMO transmission scheme is a UE RS-based transmit diversity scheme, the transmit diversity scheme preferably supports only two or four transmit antennas. In this case, only one bit in the DCI needs to be used to indicate the number of antenna ports corresponding to the UE RS. When antenna ports of different types of UE RSs need to be indicated, a plurality of bits are needed. To reduce overheads, a bit in the DCI and the number of antenna ports of the CSI-RS may be combined to indicate the antenna ports corresponding to the UE RS in the open-loop MIMO transmission scheme. For example, when the number of antenna ports of the CSI-RS is 1, a single-antenna port transmission scheme is used; when the number of antenna ports of the CSI-RS is 2, 4, or 8, one bit in the DCI is determined to indicate whether a PDSCH transmission scheme is transmit diversity scheme with two transmit antennas or transmit diversity scheme with four transmit antennas.

In addition, in the embodiment of the present invention, when the eNB indicates the PDSCH transmission scheme by using the DCI format 2C, the eNB may further send signaling carried in a new data indicator (New Data Indicator, "NDI" for short) field of a disabled transport block in the DCI to the UE, where the signaling carried in the new data indicator field is used to indicate the antenna ports corresponding to the UE RS to the UE.

Specifically, when the UE RS-based open-loop MIMO transmission scheme or the UE RS-based Non-PMI feedback transmission scheme is indicated, only one transport block is needed. In this case, a 1-bit NDI field of the disabled transport block is redundant, and may be used to indicate the number of antenna ports or antenna port numbers of the UE RS. For example, when the 1-bit NDI field is used to indicate the number of antenna ports, "0" may indicate that the number of antenna ports corresponding to the UE RS is 2, and "1" may indicate that the number of antenna ports corresponding to the UE RS is 4, or "0" may indicate that the number of antenna ports corresponding to the UE RS is 1, and "1" may indicate that the number of antenna ports corresponding to the UE RS is 2. When the 1-bit NDI field is used to indicate the number of antenna ports, antenna ports corresponding to different numbers of antenna ports need to be predefined, for example, when the number of antenna ports is 2, the antenna ports corresponding to the UE RS may be predefined as port 7 and port 8. In another example, when the 1-bit NDI field is used to indicate an antenna port number, "0" may indicate that the antenna ports corresponding to the UE RS are port 7 and port 8, and "1" may indicate that the antenna ports corresponding to the UE RS are ports X and Y.

It should be noted that when DCI used for scheduling a non-backward compatible component carrier and DCI used for scheduling a backward compatible component carrier are sent together, one PDCCH may not only schedule a PDSCH of the non-backward compatible component carrier but also schedule a PDSCH of the backward compatible component carrier. In this case, the UE determines, only according to a bit field of the non-backward compatible component carrier, a PDSCH transmission scheme determined by the eNB. Therefore, the method for indicating a PDSCH transmission scheme by using a DCI format in the embodiment of the present invention is still applicable. For example, when the DCI used for scheduling the backward compatible component carrier is in a DCI format 2C while the DCI used for scheduling the non-backward compatible component carrier is in a DCI format 1A, the DCI format 1A is displayed for the bit field of the non-backward compatible component carrier. Therefore, the PDSCH transmission scheme determined by the eNB is the UE RS-based Non-PMI feedback transmission scheme. In addition, a bit field may also be added to the PDCCH, which is sent together, to indicate the currently determined PDSCH transmission scheme and/or antenna ports. In addition, it should be understood that the eNB may also notify, by sending higher layer signaling, the UE of the determined PDSCH transmission scheme for the non-backward compatible component carrier.

The method in the embodiment of the present invention, by determining that a PDSCH transmission scheme for a non-backward compatible component carrier is a UE RS-based Non-PMI feedback transmission scheme or a UE RS-based up to 8 layer transmission scheme and notifying the scheme to a UE, can expand application scenarios of the non-backward compatible component carrier, increase spectrum utilization of the system, and avoid a system capacity decrease problem caused by limitations on the application scenarios of the non-backward compatible component carrier.

In the embodiment of the present invention, the existing UE RS is not suitable for transmit diversity, because when an odd number of resource blocks (Resource Blocks, "RBs" for short) are scheduled in a frequency domain, the number of frequency domain subcarriers is an odd number rather than an even number, and as a result, some subcarriers cannot participate in the transmit diversity. Therefore, an embodiment of the present invention provides a newly designed CRS pattern-based UE RS.

The CRS is generated and sent in the whole bandwidth of the system, while the UE RS needs to be sent to only a specific UE, that is, the UE RS is sent within a frequency domain range where the UE is scheduled. Therefore, a CRS that belongs to a same frequency domain range as the UE RS may be intercepted according to the frequency domain range of the UE RS (that is, a frequency domain range of the PDSCH transmission) and sent to the UE to act as the UE RS. Specifically, as shown in FIG. 2A, the CRS is generated in the whole bandwidth, but the eNB selects only a CRS in the frequency domain range where the UE is scheduled, and uses the CRS as the UE RS of the UE. Because the CRS supports patterns of a maximum of four antennas, the UE RS generated by using this scheme supports a maximum of four transmit antennas. It should be noted that in the embodiment of the present invention, the UE RS is acquired by using a CRS channel generation method, but the attribute of the intercepted CRS within the same frequency domain range has been changed to the UE RS. Therefore, antenna port numbers of the generated UE RS need to be redefined. It should be noted that in FIG. 2A, the CRS supports patterns only of two antennas, where the number of antennas is only an example and is not intended to limit the present invention.

Therefore, as shown in FIG. 2B, a method 200 for sending a PDSCH and a UE RS to the UE according to the embodiment of the present invention may include the following:

S210: A eNB acquires a UE RS corresponding to a PDSCH transmission scheme, where the UE RS is a signal that is intercepted from a cell-specific reference signal CRS and belongs to a same frequency domain range as the UE RS.

S220: The eNB sends the PDSCH and the UE RS corresponding to the PDSCH transmission scheme to the UE.

The foregoing method according to the embodiment of the present invention, by using a CRS pattern-based UE RS, may avoid a problem that subcarriers cannot participate in the transmit diversity, so that a non-backward compatible component carrier may support a UE RS-based transmit diversity, that is, a PDSCH transmission scheme determined by the eNB may include a transmit diversity scheme.

The method for transmitting control signaling according to an embodiment of the present invention has been hereinbefore described in detail from the perspective of the eNB and with reference to FIG. 1A to FIG. 2B. The following describes a method for transmitting control signaling from the perspective of the UE and with reference to FIG. 3A to FIG. 4.

Figure 3A:
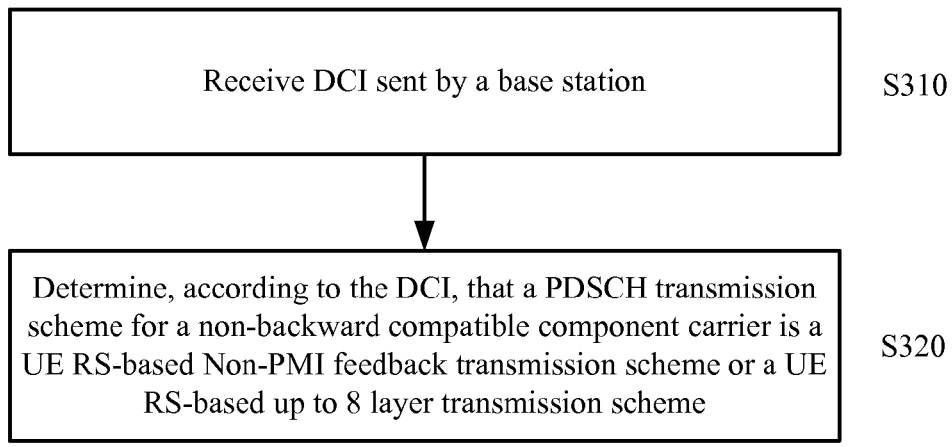
FIG. 3A and FIG. 3B are schematic flowcharts of a method for transmitting control signaling according to another embodiment of the present invention.

FIG. 3A illustrates a schematic flowchart of a method 300 for transmitting control signaling according to an embodiment of the present invention. As shown in FIG. 3A, the method 300 includes the following:

S310: Receive DCI sent by a eNB.

S320: Determine, according to the DCI, that a PDSCH transmission scheme for a non-backward compatible component carrier is a UE RS-based Non-PMI feedback transmission scheme or a UE RS-based up to 8 layer transmission scheme.

Therefore, by using the method in the embodiment of the present invention, a UE determines, according to DCI, that a PDSCH transmission scheme for a non-backward compatible component carrier is a UE RS-based Non-PMI feedback transmission scheme or a UE RS-based up to 8 layer transmission scheme. The method can expand application scenarios of the non-backward compatible component carrier, increase spectrum utilization of the system, and avoid a system capacity decrease problem caused by limitations on the application scenarios of the non-backward compatible component carrier.

Figure 3B:
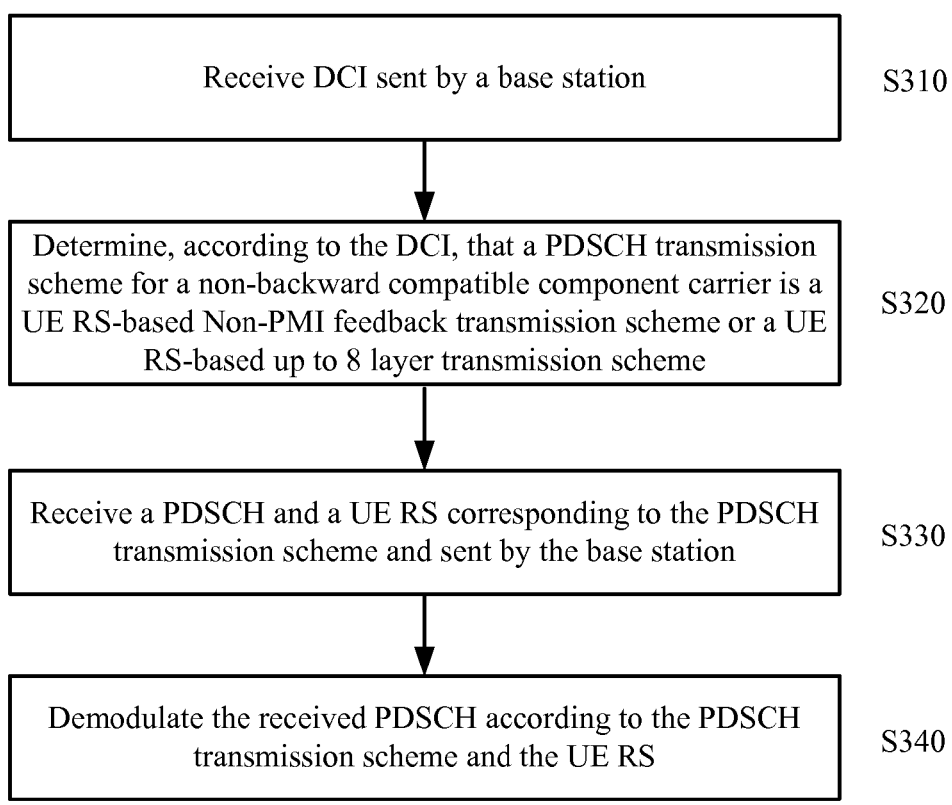

In the embodiment of the present invention, as shown in FIG. 3B, the method 300 may further include the following:

S330: Receive a PDSCH and a UE RS corresponding to the PDSCH transmission scheme and sent by the eNB.

S340: Demodulate the received PDSCH according to the PDSCH transmission scheme and the UE RS.

It should be understood that the sequence numbers of the foregoing processes do not represent priorities of the execution sequences, and that the execution sequence of each process should be determined according to functions and internal logics, and should not constitute any limitation on the implementation process of the embodiment of the present invention. For example, steps S310 and S330 may be performed concurrently, that is, the UE concurrently receives the DCI, the PDSCH, and the UE RS sent by the eNB.

In the embodiment of the present invention, the UE RS-based Non-PMI feedback transmission scheme may be a UE RS-based open-loop MIMO (UE RS based Open Loop MIMO) transmission scheme, that is, the non-backward compatible component carrier may support a UE RS-based open-loop MIMO transmission scheme or a UE RS-based up to 8 layer transmission scheme. It should be understood that the UE RS-based open-loop MIMO transmission scheme refers to a multi-antenna transmission scheme where a PMI does not need to be fed back, or a multi-antenna transmission scheme where a PMI and a rank indicator (Rank Indicator, "RI" for short) do not need to be fed back, for example, the open-loop MIMO may be transmit diversity scheme (Transmit Diversity), open-loop beamforming (Open-Loop Beamforming), or open-loop spatial multiplexing (OL SM, Open-Loop Spatial Multiplexing), and the like.

In the embodiment of the present invention, the UE RS-based Non-PMI feedback transmission scheme may also be a UE RS-based single-antenna port transmission scheme, that is, the non-backward compatible component carrier may support a UE RS-based open-loop MIMO transmission scheme, a UE RS-based single-antenna port transmission scheme, or a UE RS-based up to 8 layer transmission scheme. Therefore, in the embodiment of the present invention, the PDSCH transmission scheme determined by the eNB is a UE RS-based open-loop MIMO transmission scheme or a UE RS-based up to 8 layer transmission scheme. Alternatively, the PDSCH transmission scheme determined by the eNB is a UE RS-based single-antenna port transmission scheme or a UE RS-based up to 8 layer transmission scheme.

In step S320, the UE may determine, by using multiple formats of the DCI, a PDSCH transmission scheme determined by the eNB.

Specifically, when the DCI is in a DCI format 1A or a DCI format 1, the UE may determine that the PDSCH transmission scheme is a UE RS-based Non-PMI feedback transmission scheme; when the DCI is in a DCI format 2C, values of three bits used to indicate antenna ports, a scrambling identity, and the number of layers indication in the DCI are "111", and the DCI indicates only one transport block, the UE may determine that the PDSCH transmission scheme is a UE RS-based Non-PMI feedback transmission scheme.

In the embodiment of the present invention, the determining a PDSCH transmission scheme for the non-backward compatible component carrier by the UE not only includes determining that the PDSCH transmission scheme is specifically a UE RS-based Non-PMI feedback transmission scheme or a UE RS-based up to 8 layer transmission scheme, but also includes determining antenna ports corresponding to the UE RS.

Alternatively, the UE may determine antenna ports corresponding to the UE RS according to predefined antenna ports or according to the number of antenna ports of the CSI-RS. Alternatively, the UE may determine antenna ports corresponding to the UE RS according to signaling carried by the DCI or higher layer signaling sent by the eNB, where the signaling carried by the DCI or the higher layer signaling indicates the antenna ports corresponding to the UE RS. When the DCI received by the UE is in a DCI format 2C, the UE may determine antenna ports corresponding to the UE RS according to signaling carried in a new data indicator field of a disabled transport block in the DCI, where the signaling carried in the new data indicator field is used to indicate antenna ports corresponding to the UE RS. The method for indicating antenna ports corresponding to the UE RS is not further described herein for brevity. For details, reference may be made to the method for determining antenna ports.

In the embodiment of the present invention, alternatively, the UE RS is a signal that is intercepted from a cell-specific reference signal CRS and belongs to a same frequency domain range as the PDSCH. For specific contents, reference may be made to the foregoing descriptions. Details are not described herein for brevity.

In step S340, the received PDSCH is demodulated according to the PDSCH transmission scheme and the UE RS. After the UE determines the PDSCH transmission scheme, equalization processing is performed according to the PDSCH transmission scheme. Specifically, when the PDSCH transmission scheme is a UE RS-based up to 8 layer transmission scheme, the UE determines, according to the values of three bits used to indicate antenna ports, the scrambling identity, and the number of layers indication in the DCI format 2C, a matrix multiplied by an original signal, and then eliminates the matrix (that is, performs an inverse operation); meanwhile, the UE needs to eliminate a channel state information matrix, and restore the original signal; when the PDSCH transmission scheme is a UE RS-based single-antenna port transmission scheme, the UE needs to eliminate the channel state information matrix, and restore the original signal; when the PDSCH transmission scheme is a UE RS-based open-loop MIMO transmission scheme, the UE needs to eliminate a predefined precoding matrix and the channel state information matrix, and restore the original signal. The channel state information matrix is acquired by channel estimation. Specifically, the channel estimation is performed based on the UE RS, that is, the channel estimation is performed by using the UE RS to acquire channel state information, and then data is demodulated. In addition, before or during the foregoing equalization processing, processes of interference and noise cancellation may also be considered.

In the embodiment of the present invention, the UE RS-based Non-PMI feedback transmission scheme includes a UE RS-based open-loop multiple-input multiple-output MIMO transmission scheme. Alternatively, the UE RS-based Non-PMI feedback transmission scheme further includes a UE RS-based single-antenna port transmission scheme. In this case, whether the PDSCH transmission is the UE RS-based open-loop MIMO transmission scheme or the UE RS-based single-antenna port transmission scheme may be differentiated according to a method 400 illustrated in FIG. 4.

Figure 4:
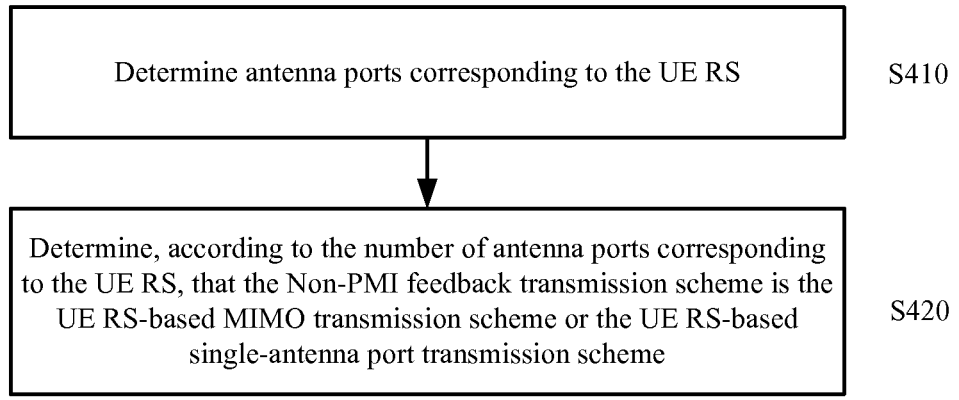
FIG. 4 is a schematic flowchart of a method for transmitting control signaling according to another embodiment of the present invention.

As shown in FIG. 4, the method 400 includes the following:

S410: Determine antenna ports corresponding to the UE RS.

S420: Determine, according to the number of antenna ports corresponding to the UE RS, that the Non-PMI feedback transmission scheme is the UE RS-based MIMO transmission scheme or the UE RS-based single-antenna port transmission scheme.

In step S410, the UE may determine antenna ports corresponding to the UE RS according to predefined antenna ports, or according to the number of antenna ports of a CSI-RS, or according to received signaling carried by the DCI or higher layer signaling, where the signaling carried by the DCI or the higher layer signaling is used to indicate the antenna ports corresponding to the UE RS; when DCI received by the UE is in a DCI format 2C, the UE may further determine antenna ports corresponding to the UE RS according to signaling carried in a new data indicator field of a disabled transport block in the DCI, where the signaling carried in the new data indicator field is used to indicate the antenna ports corresponding to the UE RS.

The UE determines, according to the number of antenna ports corresponding to the UE RS, that the Non-PMI feedback transmission scheme is the UE RS-based MIMO transmission scheme or the UE RS-based single-antenna port transmission scheme. Specifically, for example, when there is only one antenna port of the UE RS, it indicates that the currently determined PDSCH transmission scheme is the UE RS-based single-antenna port transmission scheme; otherwise, the PDSCH transmission scheme is the UE RS-based open-loop MIMO transmission scheme.

By using the method in the embodiment of the present invention, a UE determines, according to DCI, that a PDSCH transmission scheme for a non-backward compatible component carrier is a UE RS-based Non-PMI feedback transmission scheme or a UE RS-based up to 8 layer transmission scheme. The method can expand application scenarios of the non-backward compatible component carrier, increase spectrum utilization of the system, and avoid a system capacity decrease problem caused by limitations on the application scenarios of the non-backward compatible component carrier.

The following describes, with reference to FIG. 5A to FIG. 8F, an apparatus for transmitting control signaling according to embodiments of the present invention.

Figure 5A:
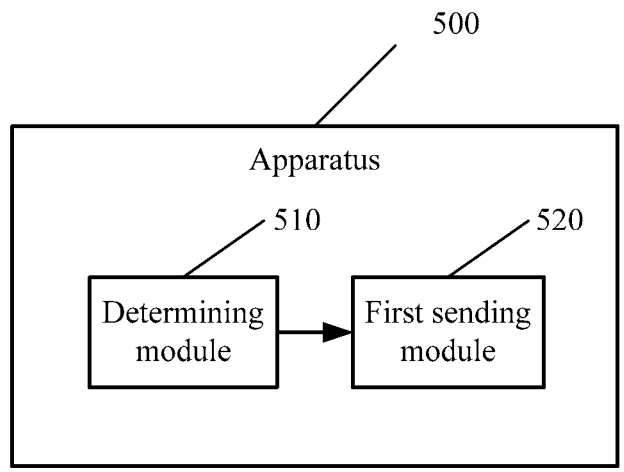
FIG. 5A and FIG. 5B are schematic block diagrams of an apparatus for transmitting control signaling according to an embodiment of the present invention.

FIG. 5A is a schematic block diagram of an apparatus 500 for transmitting control signaling according to an embodiment of the present invention. The apparatus 500 for transmitting control signaling may be configured to perform steps of the method described in the foregoing embodiments. The apparatus 500 for transmitting control signaling may be a eNB or a functional unit of a eNB. As shown in FIG. 5A, the apparatus 500 includes:

a determining module 510, configured to determine that a PDSCH transmission scheme for a non-backward compatible component carrier is a UE RS-based Non-PMI feedback transmission scheme or a UE RS-based up to 8 layer transmission scheme; and a first sending module 520, configured to send DCI to a UE, where the DCI is used to indicate the PDSCH transmission scheme determined by the determining module 510.

The apparatus in the embodiment of the present invention, by determining that a PDSCH transmission scheme for a non-backward compatible component carrier is a UE RS-based Non-PMI feedback transmission scheme or a UE RS-based up to 8 layer transmission scheme and notifying the scheme to a UE, can expand application scenarios of the non-backward compatible component carrier, increase spectrum utilization of the system, and avoid a system capacity decrease problem caused by limitations on the application scenarios of the non-backward compatible component carrier.

Alternatively, the UE RS-based Non-PMI feedback transmission scheme includes a UE RS-based open-loop multiple-input multiple-output MIMO transmission scheme or a UE RS-based single-antenna port transmission scheme. That is, in the embodiment of the present invention, the determining module 510 is configured to determine that the PDSCH transmission scheme is a UE RS-based open-loop MIMO transmission scheme or a UE RS-based up to 8 layer transmission scheme. Alternatively, the determining module 510 is configured to determine that the PDSCH transmission scheme is a UE RS-based single-antenna port transmission scheme or a UE RS-based up to 8 layer transmission scheme.

Figure 5B:
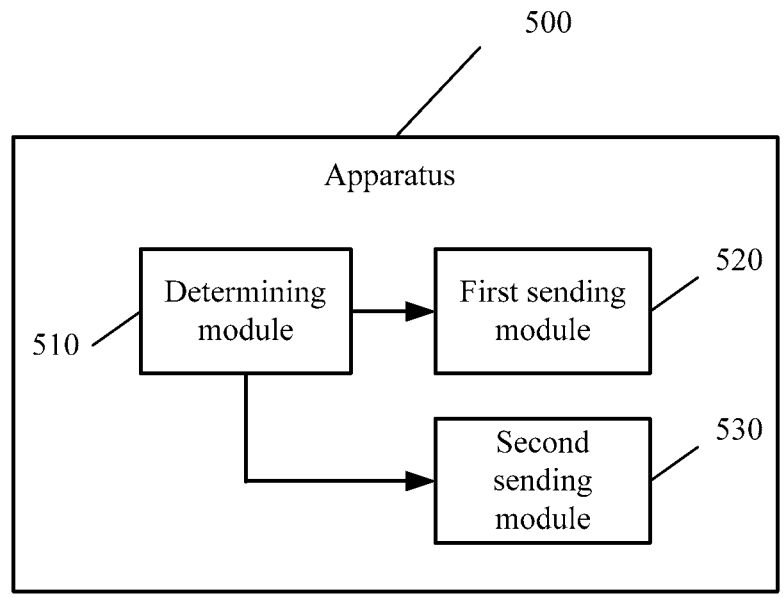

Alternatively, as shown in FIG. 5B, the apparatus 500 further includes:

a second sending module 530, configured to send a PDSCH and a UE RS corresponding to the PDSCH transmission scheme determined by the determining module 510 to the UE.

Figure 6A:
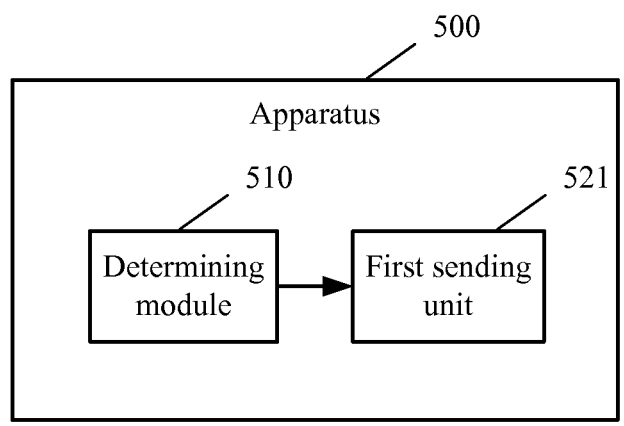
FIG. 6A to FIG. 6E are schematic block diagrams of an apparatus for transmitting control signaling according to another embodiment of the present invention.

Alternatively, as shown in FIG. 6A, the first sending module 520 includes:

a first sending unit 521, configured to send the DCI in a DCI format 1A or a DCI format 1 to the UE when the PDSCH transmission scheme determined by the determining module 510 is the UE RS-based Non-PMI feedback transmission scheme.

Figure 6B:
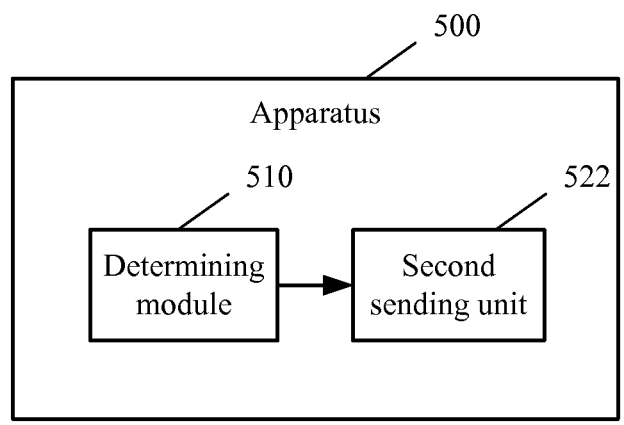

Alternatively, as shown in FIG. 6B, the first sending module 520 includes:

a second sending unit 522, configured to send the DCI in a DCI format 2C to the UE when the PDSCH transmission scheme determined by the determining module 510 is the UE RS-based Non-PMI feedback transmission scheme, where values of three bits used to indicate antenna ports, a scrambling identity, and the number of layers indication in the DCI are "111" and the DCI indicates only one transport block.

In the embodiment of the present invention, the first sending module 520 of the apparatus 500 may include a first sending unit 521 or a second sending unit 522. However, it should be understood that the first sending module 520 may include a first sending unit 521 and a second sending unit 522, where only one of the sending units is enabled and the other one is disabled.

Figure 6C:
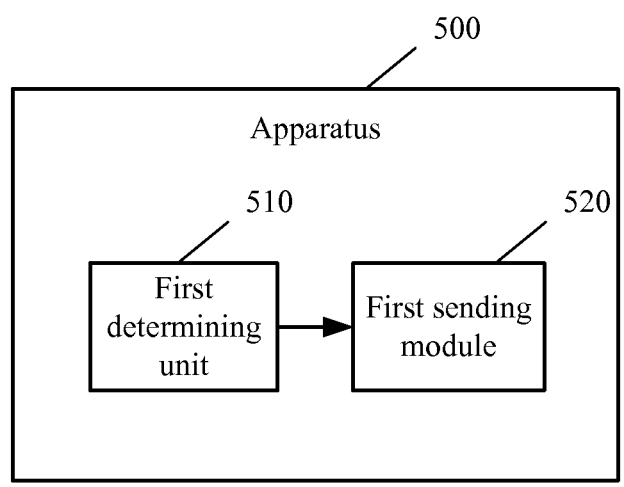

Alternatively, as shown in FIG. 6C, the determining module 510 includes:

a first determining unit 511, configured to determine antenna ports corresponding to the UE RS according to predefined antenna ports or according to the number of antenna ports contained in the channel state information-reference signal CSI-RS.

Figure 6D:
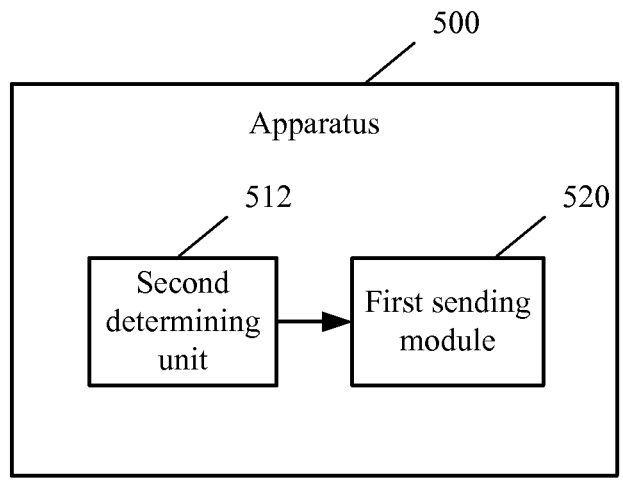

Alternatively, as shown in FIG. 6D, the determining module 510 includes:

a second determining unit 512, configured to determine antenna ports corresponding to the UE RS, and send signaling carried by the DCI or higher layer signaling to the UE, where the signaling carried by the DCI or the higher layer signaling is used to indicate the antenna ports corresponding to the UE RS.

Figure 6E:
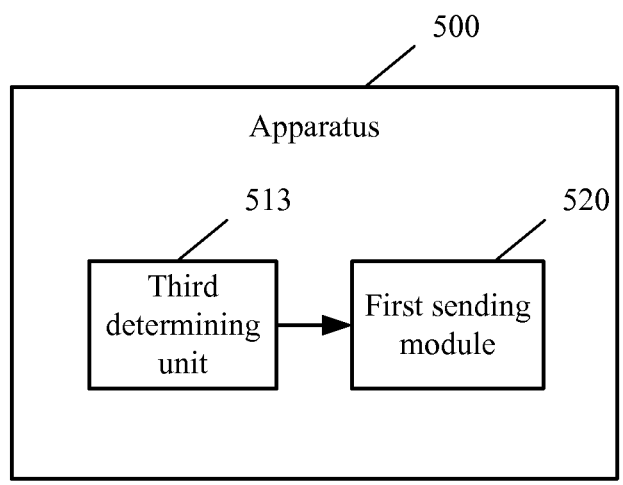

Alternatively, as shown in FIG. 6E, the determining module 510 includes:

a third determining unit 513, configured to determine antenna ports corresponding to the UE RS, and send signaling carried in a new data indicator field of a disabled transport block in the DCI to the UE, where the signaling carried in the new data indicator field is used to indicate the antenna ports corresponding to the UE RS.

In the embodiment of the present invention, the determining module 510 of the apparatus 500 may include a first determining unit 511 or a second determining unit 512 or a third determining unit 513. However, it should be understood that the determining module 510 may include a first determining unit 511, a second determining unit 512, and a third determining unit 513, where only one of the determining units is enabled and the other two determining units are disabled.

Figure 6F:
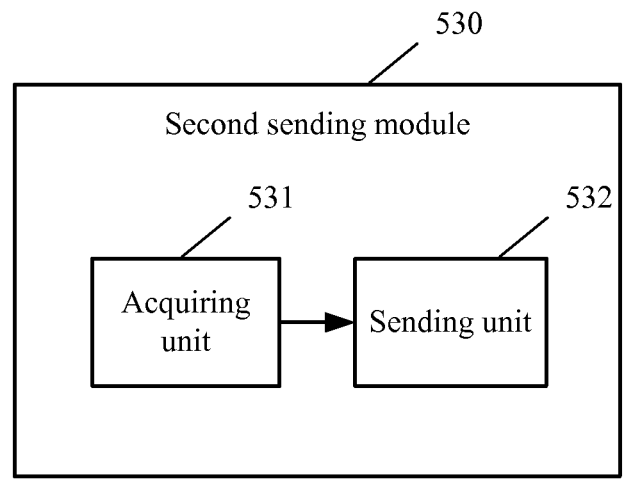
FIG. 6F is a schematic block diagram of a second sending module according to an embodiment of the present invention.

Alternatively, as shown in FIG. 6F, the second sending module 530 includes:

an acquiring unit 531, configured to acquire a UE RS corresponding to the PDSCH transmission scheme, where the UE RS is a signal that is intercepted from a CRS belongs to a same frequency domain range as the UE RS; and a sending unit 532, configured to send the PDSCH and the UE RS to the UE.

The apparatus 500 for transmitting control signaling according to the embodiment of the present invention may correspond to the eNB provided in the embodiment of the present invention, and the determining module 510, the first sending module 520, and the second sending module 530 in the apparatus 500 may be configured to respectively perform steps S110, S120, and S130 illustrated in FIG. 1A and FIG. 1B, which is not further described herein for brevity.

The apparatus in the embodiment of the present invention, by determining that a PDSCH transmission scheme of a non-backward compatible component carrier is a UE RS-based Non-PMI feedback transmission scheme or a UE RS-based up to 8 layer transmission scheme and notifying the scheme to a UE, can expand application scenarios of the non-backward compatible component carrier, increase spectrum utilization of the system, and avoid a system capacity decrease problem caused by limitations on the application scenarios of the non-backward compatible component carrier.

Figure 7A:
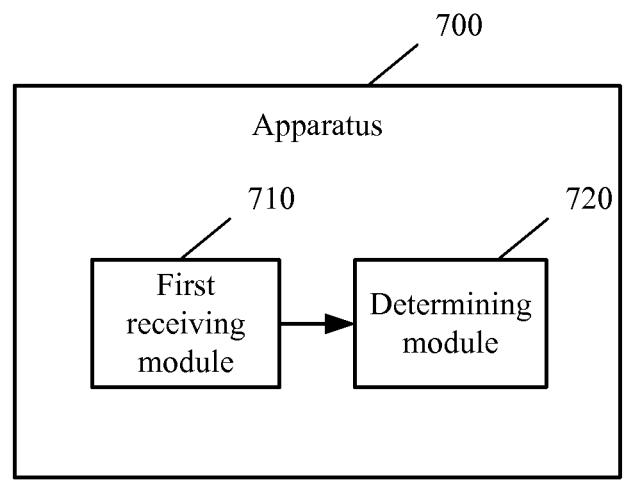
FIG. 7A and FIG. 7B are schematic block diagrams of an apparatus for transmitting control signaling according to another embodiment of the present invention.

FIG. 7A is a schematic block diagram of an apparatus 700 for transmitting control signaling according to an embodiment of the present invention. The apparatus 700 for transmitting control signaling may be configured to perform steps of the method described in the foregoing embodiments. The apparatus 700 for transmitting control signaling may be a UE or a functional unit of a UE. As shown in FIG. 7A, the apparatus 700 includes:

a first receiving module 710, configured to receive downlink control information DCI sent by a eNB; and a determining module 720, configured to determine, according to the DCI received by the first receiving module, that a physical downlink shared channel PDSCH of a non-backward compatible component carrier is a non-precoding matrix indicator Non-PMI feedback transmission scheme or a UE RS-based up to 8 layer transmission scheme based on a user equipment-specific reference signal UE RS.

Therefore, by using the apparatus in the embodiment of the present invention, a UE determines, according to DCI, that a PDSCH transmission scheme for a non-backward compatible component carrier is a Non-PMI feedback transmission scheme based on a UE RS or a UE RS-based up to 8 layer transmission scheme. The apparatus can expand application scenarios of the non-backward compatible component carrier, increase spectrum utilization of the system, and avoid a system capacity decrease problem caused by limitations on the application scenarios of the non-backward compatible component carrier.

Alternatively, the UE RS-based Non-PMI feedback transmission scheme includes a UE RS-based open-loop multiple-input multiple-output MIMO transmission scheme or a UE RS-based single-antenna port transmission scheme. That is, in the embodiment of the present invention, the determining module 720 is configured to determine that the PDSCH transmission scheme is a UE RS-based open-loop MIMO transmission scheme or a UE RS-based up to 8 layer transmission scheme. Alternatively, the determining module 720 is configured to determine that the PDSCH transmission scheme is a UE RS-based single-antenna port transmission scheme or a UE RS-based up to 8 layer transmission scheme.

Figure 7B:
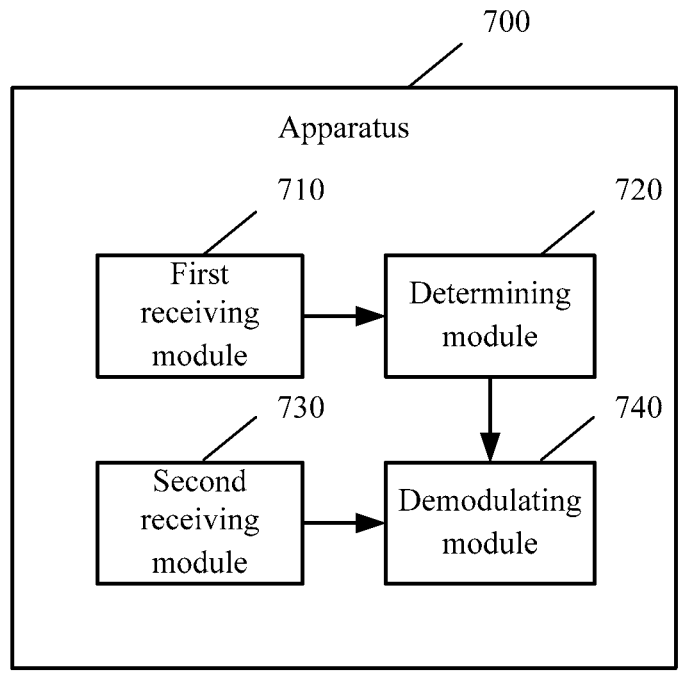

Alternatively, as shown in FIG. 7B, the apparatus 700 further includes:

a second receiving module 730, configured to receive a PDSCH and a UE RS corresponding to the PDSCH transmission scheme and sent by the eNB; and a demodulating module 740, configured to demodulate, according to the PDSCH transmission scheme determined by the determining module 720 and the UE RS received by the second receiving module 730, the PDSCH received by the second receiving module 730.

Figure 8A:
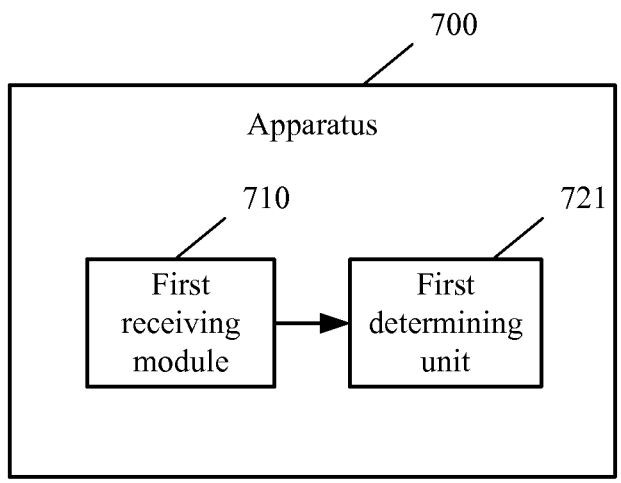
FIG. 8A to FIG. 8E are schematic block diagrams of an apparatus for transmitting control signaling according to another embodiment of the present invention.

Alternatively, as shown in FIG. 8A, the determining module 720 includes:

a first determining unit 721, configured to determine that the PDSCH transmission scheme is the UE RS-based Non-PMI feedback transmission scheme when the DCI is in a DCI format 1A or a DCI format 1.

Figure 8B:
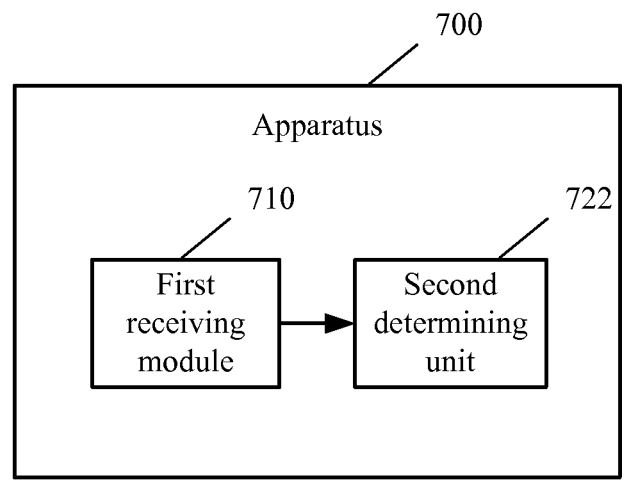

Alternatively, as shown in FIG. 8B, the determining module 720 includes:

a second determining unit 722, configured to determine that the PDSCH transmission scheme is the UE RS-based Non-PMI feedback transmission scheme when the DCI is in a DCI format 2C, values of three bits used to indicate antenna ports, a scrambling identity, and the number of layers indication in the DCI are "111", and the DCI indicates only one transport block.

In the embodiment of the present invention, the determining module 720 of the apparatus 700 may include a first determining unit 721 or a second determining unit 722. However, it should be understood that the determining module 720 may include a first determining unit 721 and a second determining unit 722.

Figure 8C:
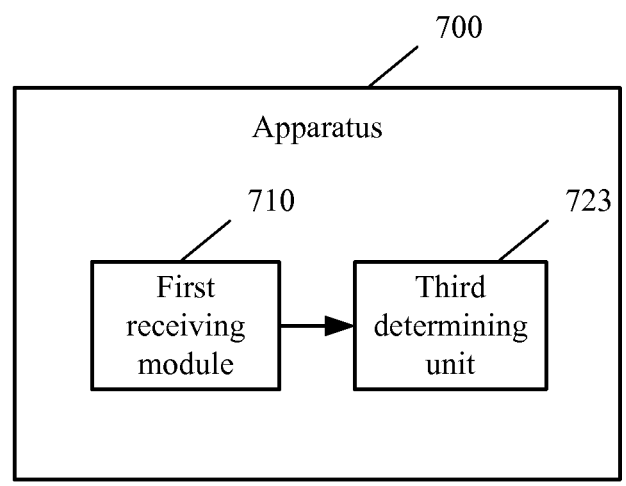

Alternatively, as shown in FIG. 8C, the determining module 720 further includes:

a third determining unit 723, configured to determine antenna ports corresponding to the UE RS according to predefined antenna ports or according to the number of antenna ports contained in the channel state information-reference signal CSI-RS.

Figure 8D:
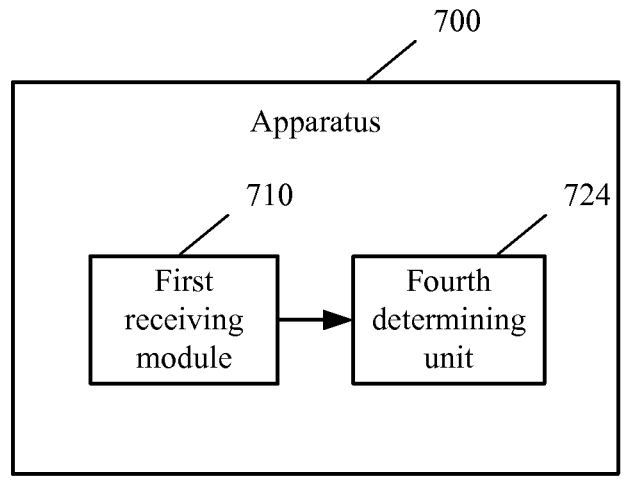

Alternatively, as shown in FIG. 8D, the determining module 720 further includes:

a fourth determining unit 724, configured to determine antenna ports corresponding to the UE RS according to higher layer signaling that is sent by the eNB and used to indicate antenna ports of the UE RS or according to signaling carried by the DCI that is sent by the eNB and used to indicate antenna ports of the UE RS.

Figure 8E:
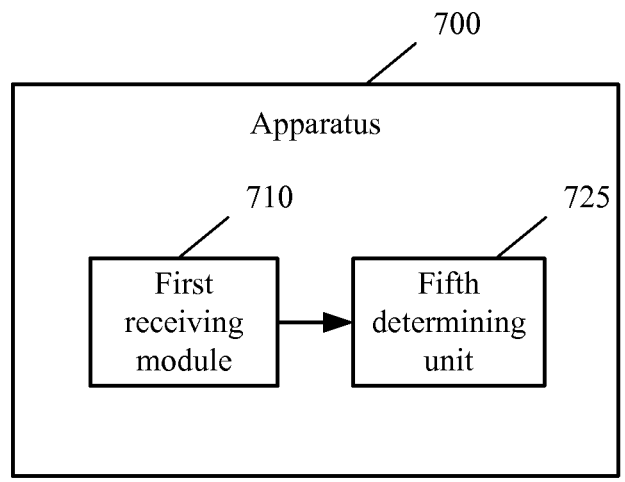

Alternatively, as shown in FIG. 8E, the determining module 720 further includes:

a fifth determining unit 725, configured to determine antenna ports corresponding to the UE RS according to signaling carried in a new data indicator field of a disabled transport block in DCI that is sent by the eNB.

In the embodiment of the present invention, the determining module 720 of the apparatus 700 may further include a third determining unit 723, a fourth determining unit 724 or a fifth determining unit 725. However, it should be understood that the determining module 720 may further include a third determining unit 723, a fourth determining unit 724, and a fifth determining unit 725.

Figure 8F:
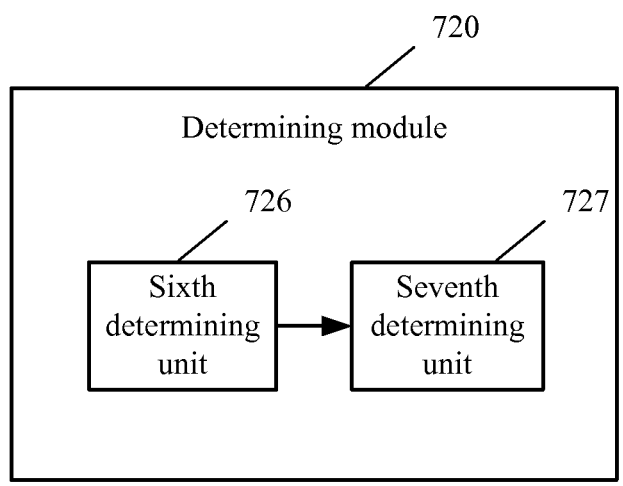
FIG. 8F is a schematic block diagram of a determining module according to an embodiment of the present invention.

Alternatively, as shown in FIG. 8F, the determining module 720 further includes:

a sixth determining unit 726, configured to determine antenna ports corresponding to the UE RS; and a seventh determining unit 727, configured to determine, according to the number of antenna ports corresponding to the UE RS, that the Non-PMI feedback transmission scheme is the UE RS-based MIMO transmission scheme or the UE RS-based single-antenna port transmission scheme.

The apparatus 700 for transmitting control signaling according to the embodiment of the present invention may correspond to the UE provided in the embodiment of the present invention, and the first receiving module 710, the determining module 720, the second receiving module 730, and the demodulating module 740 in the apparatus 700 may be configured to respectively perform steps S310, S320, S330, and S340 illustrated in FIG. 3A and FIG. 3B, which is not further described herein for brevity.

Therefore, by using the apparatus in the embodiment of the present invention, a UE determines, according to DCI, that a PDSCH transmission scheme for a non-backward compatible component carrier is a Non-PMI feedback transmission scheme based on a UE RS or a UE RS-based up to 8 layer transmission scheme. The apparatus can expand application scenarios of the non-backward compatible component carrier, increase spectrum utilization of the system, and avoid a system capacity decrease problem caused by limitations on the application scenarios of the non-backward compatible component carrier.

A person of ordinary skill in the art may appreciate that, in combination with the examples described in the embodiments disclosed in this specification, units and steps of the algorithm may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the schemes of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several signalings for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for transmitting, by a network node, control signaling, comprising:
   determining that a physical downlink shared channel (PDSCH) transmission scheme for a component carrier accessed by a user equipment (UE) is:
      a user equipment-specific reference signal (UE RS) based non precoding matrix indicator (Non-PMI) feedback transmission scheme by determining antenna ports corresponding to the UE RS wherein a Non-PMI feedback transmission scheme is a transmission scheme where no PMI is fed back by a UE; and
   notifying the UE of the determined PDSCH transmission scheme by sending, by the network node, downlink control information (DCI) to the UE, where the format of the DCI is DCI format 1A, DCI format 1, or DCI format 2C, and wherein a disabled transport block in the DCI carries signaling used to indicate the determined antenna ports corresponding to the UE RS.

2. The method according to claim 1, wherein values of three bits used to indicate antenna ports, a scrambling identity, and a number of layers indication in the DCI are "111" and the format of the DCI is DCI format 2C, and wherein the DCI indicates only one enabled transport block when the format of the DCI is DCI format 2C.

3. The method according to claim 1, wherein:
   determining antenna ports corresponding to the UE RS is performed according to one selected from the group consisting of:
      predefined antenna ports, and
      a number of antenna ports contained in the channel state information-reference signal (CSI-RS).

4. The method according to claim 1, further comprising:
   sending, to the UE, a PDSCH and a UE RS corresponding to the PDSCH transmission scheme.

5. The method according to claim 4, wherein the sending, to the UE, a PDSCH and a UE RS corresponding to the PDSCH transmission scheme comprises:
   acquiring a UE RS corresponding to the PDSCH transmission scheme by intercepting the UE RS from a cell-specific reference signal (CRS) configured on a component carrier accessed by the UE, wherein the UE RS belongs to a frequency domain range that is the same as a frequency domain range of the PDSCH; and
   sending the PDSCH and the UE RS to the UE.

6. A method for transmitting control signaling, comprising:
   receiving, by a user equipment (UE), downlink control information (DCI) sent by an eNB; and
   determining, by the UE according to the DCI, that a physical downlink shared channel (PDSCH) transmission scheme for a component carrier accessed by the UE is:
      a user equipment-specific reference signal (UE RS) based non-precoding matrix indicator (Non-PMI) feedback transmission scheme by determining antenna ports corresponding to the UE RS, wherein a Non-PMI feedback transmission scheme is a transmission scheme where no PMI is fed back by a UE;
   wherein the format of the DCI is DCI format 1A, DCI format 1, or DCI format 2C, and wherein a disabled transport block in the DCI carries signaling used to indicate the determined antenna ports corresponding to the UE RS.

7. The method according to claim 6, wherein values of three bits used to indicate antenna ports, a scrambling identity, and a number of layers indication in the DCI are "111" and the format of the DCI is DCI format 2C, and wherein the DCI indicates only one enabled transport block when the format of the DCI is DCI format 2C.

8. The method according to claim 6, wherein:
   determining antenna ports corresponding to the UE RS is performed according to one selected from the group consisting of:
      predefined antenna ports, and
      a number of antenna ports contained in a channel state information-reference signal (CSI-RS).

9. The method according to any claim 6, further comprising:
   receiving, by the UE from the eNB, a PDSCH and a UE RS corresponding to the PDSCH transmission scheme, and
   demodulating the received PDSCH according to the PDSCH transmission scheme and the UE RS.

10. An apparatus for transmitting control signaling, comprising:
    a processor, configured to determine that a physical downlink shared channel (PDSCH) transmission scheme for a component carrier accessed by a user equipment (UE) is a user equipment-specific reference signal (UE RS)-based non-precoding matrix indicator (Non-PMI) feedback transmission scheme by determining antenna ports corresponding to the UE RS, wherein a Non-PMI feedback transmission scheme is a transmission scheme where no PMI is fed back by a UE; and
    a transmitter, configured to notify the UE of the determined PDSCH by sending downlink control information (DCI) to the UE, wherein the format of the DCI is DCI format 1A, DCI format 1, or DCI format 2C, and wherein a disabled transport block in the DCI carries signaling used to indicate the determined antenna ports corresponding to the UE RS.

11. The apparatus according to claim 10, wherein values of three bits used to indicate antenna ports, a scrambling identity, and a number of layers indication in the DCI are "111" and the format of the DCI is format 2C, and the DCI indicates only one enabled transport block when the format of the DCI is DCI format 2C.

12. The apparatus according to claim 10, wherein the processor is further configured to perform one or more of the group consisting of:
 determine antenna ports corresponding to the UE RS according to one selected from the group consisting of: predefined antenna ports, and
  a number of antenna ports contained in the channel state information-reference signal (CSI-RS).

13. The apparatus according to claim 10, further comprising:
 a transceiver, configured to send, to the UE, a PDSCH and a UE RS corresponding to the PDSCH transmission scheme determined by the processor.

14. The apparatus according to claim 13, wherein the transceiver is further configured to:
 acquire a UE RS corresponding to the PDSCH transmission scheme by intercepting the UE RS from a cell-specific reference signal (CRS) configured on a component carrier accessed by the UE, wherein the CRS belongs to a frequency domain range that is the same as a frequency domain range of the UE RS; and
 send the PDSCH and the UE RS to the UE.

15. An apparatus of a user equipment (UE) for transmitting control signaling, comprising:
 a receiver, configured to receive downlink control information (DCI) sent by an eNB; and
 a processor, configured to:
  determine, according to the DCI, that a physical downlink shared channel (PDSCH) transmission scheme for a component carrier accessed by the UE is a user equipment-specific reference signal (UE RS) based non-precoding matrix indicator (Non-PMI) feedback transmission scheme by determining antenna ports corresponding to the UE RS, wherein a Non-PMI feedback transmission scheme is a transmission scheme where no PMI is fed back by a UE,
 wherein the format of the DCI is DCI format 1A, DCI format 1, or DCI format 2C, and wherein a disabled transport block in the DCI carries signaling used to indicate the determined antenna ports corresponding to the UE RS.

16. The apparatus according to claim 15, wherein values of three bits used to indicate antenna ports, a scrambling identity, and a number of layers indication in the DCI are "111" and the format of the DCI is DCI format 2C, and wherein the DCI indicates only one enabled transport block when the format of the DCI is DCI format 2C.

17. The apparatus according to claim 15, wherein the processor is further configured to perform one or more of the group consisting of:
 determine antenna ports corresponding to the UE RS according to one selected from the group consisting of: predefined antenna ports and the number of antenna ports contained in the channel state information-reference signal (CSI-RS).

18. The apparatus according to claim 15, further comprising:
 a second receiver, configured to receive a PDSCH and a UE RS corresponding to the PDSCH transmission scheme and sent by the eNB; and
 wherein the processor is further configured to demodulate, according to the PDSCH transmission scheme determined by the processor and the UE RS received by the second receiver, the PDSCH received by the second receiver.

* * * * *